US012036566B2

United States Patent
Cloud et al.

(10) Patent No.: US 12,036,566 B2
(45) Date of Patent: Jul. 16, 2024

(54) GAS-LIQUID SEPARATOR ASSEMBLY

(71) Applicant: Supercritical Fluid Technologies, Inc., Newark, DE (US)

(72) Inventors: Andrew Cloud, Wilmington, DE (US); Kenneth Richard Krewson, Allentown, NJ (US); Kenneth Joseph James, Newark, DE (US)

(73) Assignee: Supercritical Fluid Technologies, Inc., Newark, DE (US)

( * ) Notice: Subject to any disclaimer, the term of this patent is extended or adjusted under 35 U.S.C. 154(b) by 0 days.

(21) Appl. No.: 18/485,807

(22) Filed: Oct. 12, 2023

(65) Prior Publication Data

US 2024/0042460 A1 Feb. 8, 2024

Related U.S. Application Data

(63) Continuation of application No. PCT/US2022/024267, filed on Apr. 11, 2022.
(Continued)

(51) Int. Cl.
*B01D 45/12* (2006.01)
*B04C 5/04* (2006.01)
(Continued)

(52) U.S. Cl.
CPC .............. *B04C 5/081* (2013.01); *B01D 45/12* (2013.01); *B04C 5/04* (2013.01); *B04C 5/103* (2013.01);
(Continued)

(58) Field of Classification Search
CPC ........... B04C 5/081; B04C 5/04; B04C 5/103; B01D 45/12; B01D 15/24; B01D 15/40; G01N 30/84
See application file for complete search history.

(56) References Cited

U.S. PATENT DOCUMENTS

| 3,590,558 | A | * | 7/1971 | Fernandes | ............... B04C 5/103 |
| | | | | | 55/460 |
| 3,800,946 | A | * | 4/1974 | Reid | ....................... B04C 5/103 |
| | | | | | 209/733 |

(Continued)

FOREIGN PATENT DOCUMENTS

| CN | 2455369 Y | 10/2001 |
| CN | 200991661 Y | 12/2007 |

(Continued)

OTHER PUBLICATIONS

International Search Report for PCT/US2022/024267, issued Jul. 5, 2022.
Written Opinion for PCT/US2022/024267, issued Jul. 5, 2022.

*Primary Examiner* — Dung H Bui
(74) *Attorney, Agent, or Firm* — Devlin Law Firm LLC; James M. Lennon

(57) ABSTRACT

A gas-liquid separator system that can effectively and efficiently separate liquid from a streaming mixture having a liquid portion and a gas portion. The gas-liquid separator may be used in supercritical fluid chromatography application where an analyte is separated from a carrier gas, such as carbon dioxide. A streaming mixture is dispensed into a separation chamber formed by a spindle shaft configured inside of a shroud cavity. The shroud cavity has a plurality of concave channels along the inner surface and extend down to an outlet end. The concave channels create pressure variations that promote the liquid portion to condense onto the inner surface of the shroud and flow down to the exhaust port. A spherical collection portion is configured on the outlet of the shroud and the condensed liquid flows thereover and down along a cone portion and off the cone tip.

19 Claims, 6 Drawing Sheets

Related U.S. Application Data

(60) Provisional application No. 63/173,566, filed on Apr. 12, 2021.

(51) Int. Cl.
    *B04C 5/081*     (2006.01)
    *B04C 5/103*     (2006.01)
    *B01D 15/24*     (2006.01)
    *B01D 15/40*     (2006.01)
    *G01N 30/84*     (2006.01)

(52) U.S. Cl.
    CPC .............. *B01D 15/24* (2013.01); *B01D 15/40* (2013.01); *G01N 30/84* (2013.01)

(56) References Cited

U.S. PATENT DOCUMENTS

| | | | | |
|---|---|---|---|---|
| 4,305,825 | A * | 12/1981 | Laval, Jr. | B04C 5/103 210/512.1 |
| 4,810,264 | A * | 3/1989 | Dewitz | B04C 5/103 210/512.3 |
| 5,252,229 | A * | 10/1993 | Rojey | B01D 17/0217 210/512.3 |
| 5,770,050 | A * | 6/1998 | Trefz | B01F 25/3141 210/512.1 |
| 6,019,825 | A * | 2/2000 | Greene | B04C 5/103 96/216 |
| 6,036,749 | A | 3/2000 | Ribeiro et al. | |
| 6,168,716 | B1 * | 1/2001 | Conrad | B04C 3/00 210/512.1 |
| 6,234,621 | B1 * | 5/2001 | Musser | B41J 2/175 347/92 |
| 6,312,594 | B1 * | 11/2001 | Conrad | B04C 3/00 55/459.3 |
| 10,213,794 | B1 * | 2/2019 | Miller | B04C 5/14 |
| 10,717,026 | B1 * | 7/2020 | Anderson | B01D 19/0057 |
| 11,692,418 | B2 * | 7/2023 | Zhang | E21B 43/38 166/105.1 |
| 2009/0120850 | A1 * | 5/2009 | Kruyer | C10G 1/045 209/725 |
| 2012/0037489 | A1 * | 2/2012 | Zanstra | B01D 19/0063 202/177 |
| 2012/0187032 | A1 * | 7/2012 | Davey | A47L 7/0009 210/512.3 |
| 2013/0327727 | A1 * | 12/2013 | Hopper | B01D 17/0217 166/368 |
| 2016/0121248 | A1 * | 5/2016 | Urban | B01D 35/1573 210/252 |
| 2019/0168147 | A1 * | 6/2019 | Bratton | B01D 45/12 |
| 2019/0184327 | A1 * | 6/2019 | Wikfors | G01N 30/84 |
| 2021/0154685 | A1 * | 5/2021 | Porkert | B04C 5/04 |
| 2021/0154686 | A1 * | 5/2021 | Vilagines | B04C 5/28 |
| 2021/0190018 | A1 * | 6/2021 | Williams | F02M 35/0223 |

FOREIGN PATENT DOCUMENTS

JP           2015-182075 A     10/2015
WO     WO 2020/260354 A1    12/2020

\* cited by examiner

GAS-LIQUID SEPARATOR ASSEMBLY

CROSS REFERENCE TO RELATED APPLICATIONS

This application is a bypass continuation application of PCT Application No. PCT/US2022/024267, filed Apr. 11, 2022, which claims the benefit of priority to U.S. provisional patent application No. 63/173,566, filed on Apr. 12, 2021; the entirety of which is hereby incorporated by reference herein.

BACKGROUND OF THE INVENTION

Field of the Invention

The invention relates to a gas-liquid separator system that employs a gas-liquid separator having a separation chamber formed between a spindle and an inner surface of a shroud having an undulating inner surface comprises of a plurality of concave channels that extend to a spherical collection portion and finally to a cone portion for directing condensed liquid to the cone tip.

Background

Gas liquid separators are used to separate a liquid portion of a streaming mixture, such as an aerosol, from a gas portion. This process is used in supercritical fluid chromatography, wherein an analyte is separated from a carrier or sweep gas. The exhaust components of an aerosol spray, methanol containing liquid analyte droplets and carbon dioxide gas, are difficult to separate in supercritical fluid chromatography because of high aerosol velocity and space constraints. A key problem is liquid analyte loss due to aerosol overspray. Additionally, liquid analyte cross contamination from previously separated species within a multi-analyte separation process can be problematic due to both liquid and gas dead space volume.

SUMMARY OF THE INVENTION

The invention is directed to a gas-liquid separator system that can effectively and efficiently separate liquid from a streaming mixture having a liquid portion and a gas portion. The gas-liquid separator may be used is a supercritical fluid chromatography application where an analyte is separated from a carrier gas, such as carbon dioxide. Recovering a high percentage of the analyte is important for analyte analysis. The gas-liquid separator reduces overspray and loss of sample as the streaming mixture is dispensed into a separation chamber that directs the streaming mixture to spiral between an inner surface of a shroud and the outer surface of a spindle configured in the shroud cavity. The streaming mixture is directed by a supply tube that extends through the shroud to a dispense end that is configured to direct the streaming mixture tangentially along the inner surface of the shroud or outer surface of the spindle shaft. The speed of the streaming mixture may be very high, such as subsonic. One milliliter of carbon dioxide liquid expands to ~425 ml of carbon dioxide gas and the rate of flow through the supply tube is about 125 ml/min Liquid $CO_2$ or 53,125 mls $CO_2$ Gas. This produces a very high flow of gas from the nozzle as the gas expands. The expansion of the streaming mixture cools the streaming mixture by the joule-Thompson cooling effect in the separation chamber. The liquid portion of the streaming mixture, or aerosol, condenses within the separation chamber. The inner surface of the shroud has a plurality of concave channels having a concave channel surface with respect to the separation chamber. The concave channels are coupled together by channel connectors which may have a convex connector surface with respect to the separation chamber. These concave channels extend vertically along the shroud and the condensed liquid portion flows downs these vertical channels to exhaust ports. A spherical collection portion of the spindle assembly is configured proximal to the outlet end of the shroud and the liquid portion flows out of the exhaust ports and onto the spherical collection portion. A cone portion is coupled to the spherical collection portion and extends down to a cone tip. The liquid portion, or analyte, flows down the cone portion and off the cone tip into a collection container.

The shroud has a shroud cavity forming a cylindrical aperture through the shroud. The inner surface of the shroud has a plurality of concave channels that extend down to the outlet end. The supply tube extends through the wall of the shroud proximal the inlet end, or top of the shroud when configured with the length axis of the shroud vertically. The concave channels extend vertically down along the inner surface of the shroud to the outlet end and the exhaust ports. The shroud may have a number of concave channels configured around the perimeter of the inner surface of the shroud such as about three or more, about four or more, about five or more, about six or more, about eight or more, about ten or more and any range between and including the number of concave channels provided. The radius of curvature of the concave channels may be much smaller than the radius of curvature of the spindle configured within shroud cavity, such as about one quarter or less, about one sixth or less, about one eight or less, about one tenth or less, about one twelfth or less or any range between and including the ratios provided. Also, the radius of curvature of the concave channels may be much larger than the radius of curvature of the convex connector surface, such as about four times greater or more, about six times greater or more, about eight times greater or more, about ten times greater or more and any range between and including the values provided. The undulating inner surface of the shroud creates fluctuations in pressure as the streaming mixture flows and spirals around the separation chamber down to the exhaust ports. This fluctuation in pressure aids in causing the liquid portion to condense out on the inner surface of the shroud. The shroud may be a material that is thermally conductive and may be cooled by the cooling of the expanding streaming mixture and may be metal for example.

The spindle assembly includes the spindle shaft that extends up into the shroud cavity to form the separation chamber. The spindle shaft may be cylindrical in shape and have a circular cross section along the length of the spindle. The extended end of the spindle shaft may have threads that are configured to detachably attach to threads of a shroud cap. The spindle shaft may be threaded into threads of the shroud cap to configured the spherical collection portion proximal to the outlet end of shroud to form the exhaust ports. The spherical collection portion may be moved closer to or further away from the outlet end of the shroud as required to tune the system for effective liquid portion recover. The spherical collection portion has a diameter that is larger than the diameter of the spindle shaft such as about 1.25 times or more, about 1.5 times or more, about 2.0 times or more, about 2.5 times or more, about 3 times or more and any range between and including the values provided. Put another way, the diameter of the spindle shaft may be between about 25% or more, about 35% or more, about 50% or more, about 75% or more, or about 80% or less the diameter of the spherical collection portion. The spindle assembly has a cone portion that is coupled to the spherical collection portion and extends down to a cone tip. The condensed liquid portion flows down over the spherical collection portion onto the cone portion and off of the cone tip into a collection container. The cone portion is cone shaped having a diameter that tapers in dimension from the connection with the spherical collection portion to the cone tip. The diameter of the cone at the collection-cone interface may be about the same diameter as the spherical collection portion but preferably less than the diameter of the spherical collection portion, such as about 90% or less, about 80% or less, about 70% or less, about 70% or less, about 60% or less and any range between and including the values provided. If the diameter of the cone portion at the collection-cone interface is too much smaller than the diameter of the spherical collection portion, some condensed liquid may drip off of the spherical collection portion. The spindle assembly or at least the spindle shaft may be a thermally conductive material such as metal.

The spindle shaft and/or the shroud may be thermally conductive and may be made out of metal such as stainless steel. The inner surface of the shroud and/or the outer surface of the spindle shaft may be polished and may have a surface roughness of about 1.0 Ra. The shroud and/or the spindle shaft may be made out of a polymeric material, such as a molded plastic, and preferably a polymeric material that has a low surface energy to promote liquids to flow down along the surface, such as polyethylene, or a fluoropolymer including, but not limited to, polytetrafluoroethylene, Polyetheretherketone (PEEK), fluorinated-ethylene-propylene (FEP) or other thermoplastic fluoropolymers.

The supply tube may be configured proximal to the inlet end of the shroud such as within about 25% or less of the length of the shroud from the inlet end, or within about 10% or less of the length of the shroud from the inlet end. The dispense end of the supply tube may be configured to dispense the streaming mixture tangentially along the separation chamber formed by the inner surface of the shroud and the outer surface of the spindle shaft. The outlet flow of streaming mixture may flow substantially tangentially to either of the inner surface of the shroud and the outer surface of the spindle shaft, such as within about 20 degrees or less from tangent, within about 10 degrees or less from tangent, or even 5 degrees or less from tangent to one of these surfaces and any range between and including the values provided. Directing the flow of the streaming mixture tangentially to the separation chamber causes the streaming mixture to spiral around the separation chamber in a more controlled manner to reduce overspray.

The gas-liquid separator assembly is very quick and easy to assembly and also very easy to disassemble for cleaning between streaming mixture samples. The extended end of the spindle shaft may have threads to enable quick coupling with the threads in the shroud cap. Unthreading the spindle shaft from the shroud cap enables removal of the shroud cap from the shroud and exposes the conduit in the shroud from the inlet end to the outlet end and this enables the inner surface of the shroud to be cleaned by flowing a cleaning liquid through the shroud.

The gas-liquid separator assembly may be sized for effective liquid portion recovery and may have dimensions to enable effective recovery. The shroud may have an inner diameter, or diameter of the inner surface of about 12 mm or more, about 20 mm or more, about 30 mm or more, about 50 mm or more or any range between and including the diameters provided. The length of the shroud from the inlet end to the outlet end may be about 12 mm or more, about 20 mm or more, about 30 mm or more, about 50 mm or more or any range between and including the length values provided. The concave channel surface of the concave channels may have a radius of curvature of about 2 mm or more, about 3 mm or more, about 5 mm or more, about 8 mm or more or any range between and including the values provided. The radius of curvature may be sized for the diameter of the inner surface of the shroud. The radius of curvature of the convex surface of the convex channel connectors may be about 0.2 mm or more, about 0.5 mm or more, about 1 mm or more or less than about 1 mm and any range between and including the values provided. The ratio of the radius of curvature of convex channel surface to the concave connector surface may be about 3:1 or more, about 5:1 or more, about 8:1 or more, about 1:2 or less, about 1:5 or less, about 1:10 or less, or between about 2:1 to about 10:1 or any other range between and including the values provided.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
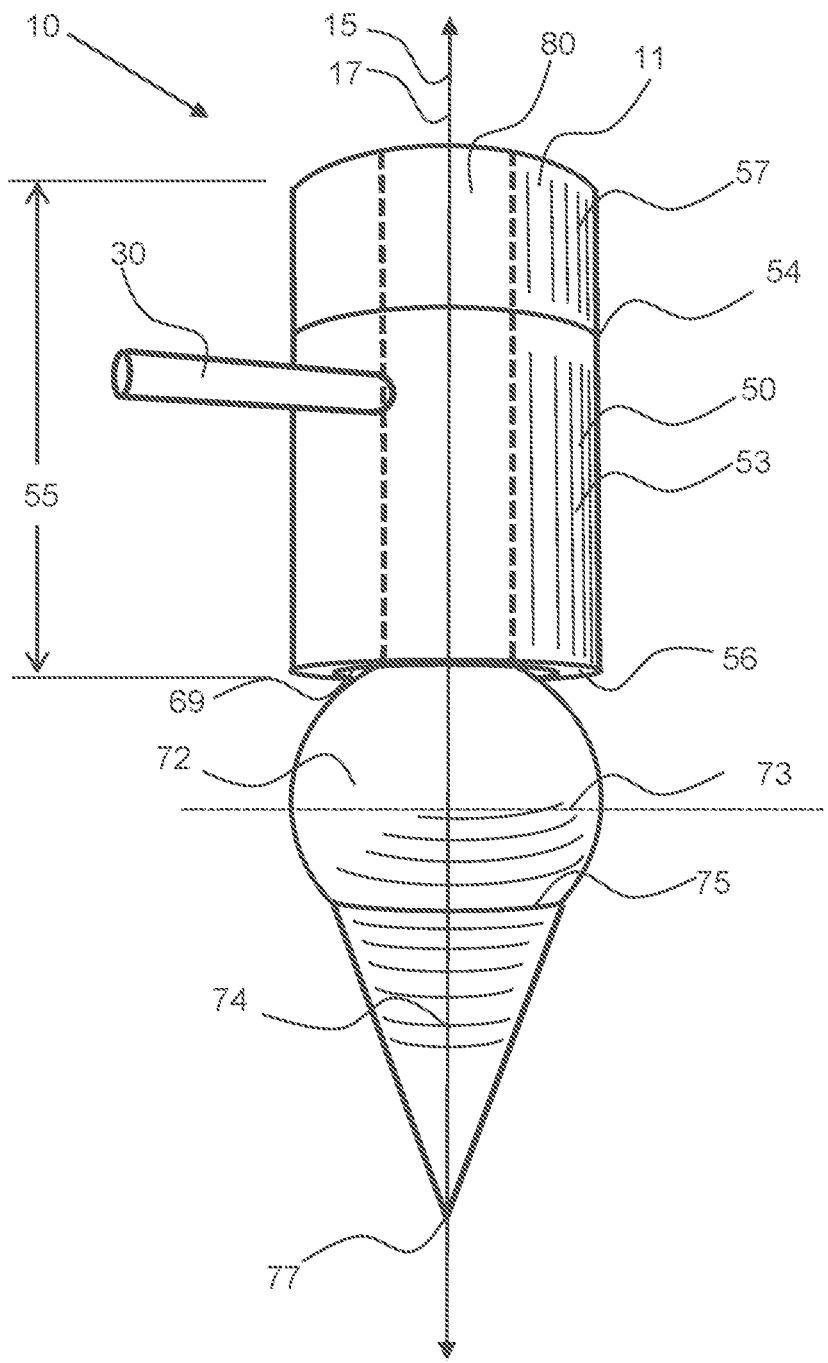
FIG. 1 shows a side perspective view of a gas-liquid separator system having a shroud that receives an aerosol through a supply tube and a spindle assembly having a spindle shaft extending up into the shroud, a spherical collection portion configured on an outlet end of the shroud and a cone portion coupled to the spherical collection portion and extending to a cone tip.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
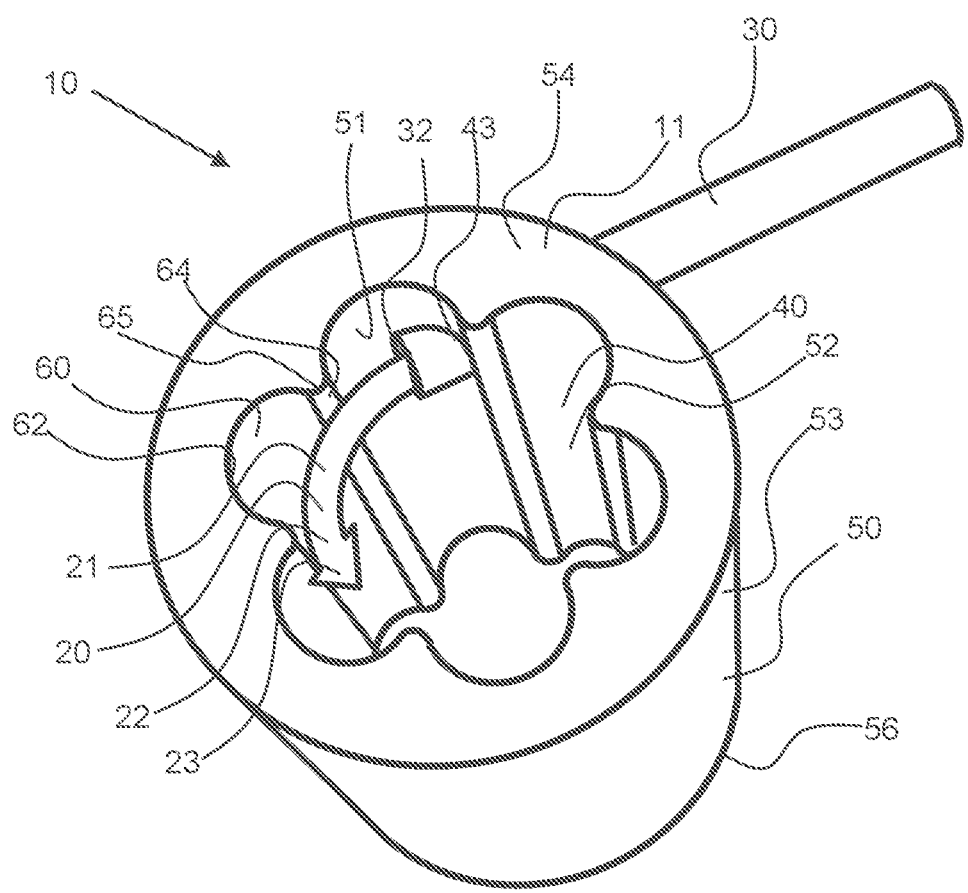
FIG. 2 shows a perspective view of the shroud and shroud cavity forming a separation chamber for an aerosol with concave channels extending down to the outlet end and with the dispend end of the supply tube configured to dispense the aerosol tangentially along the inner surface of the shroud wall.
Figure 5:
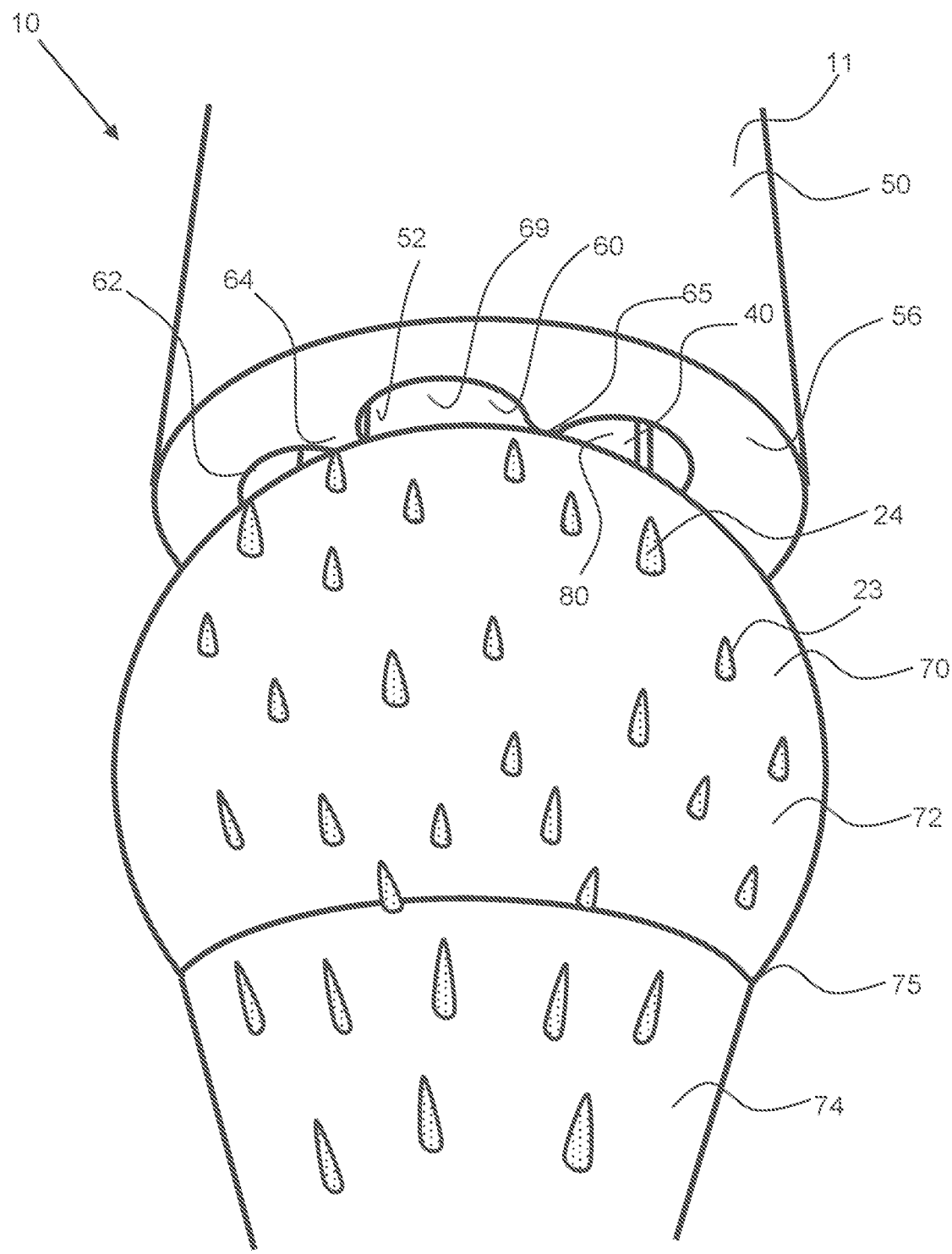
FIG. 5 shows a perspective view of the outlet end of the shroud with the spindle shaft extending up into the shroud cavity and with the spherical collection portion configured proximal to the outlet end to form exhaust ports for the aerosol, wherein condensed analyte flows out of exhaust ports over the spherical collection portion and down along the cone portion.
Figure 6:
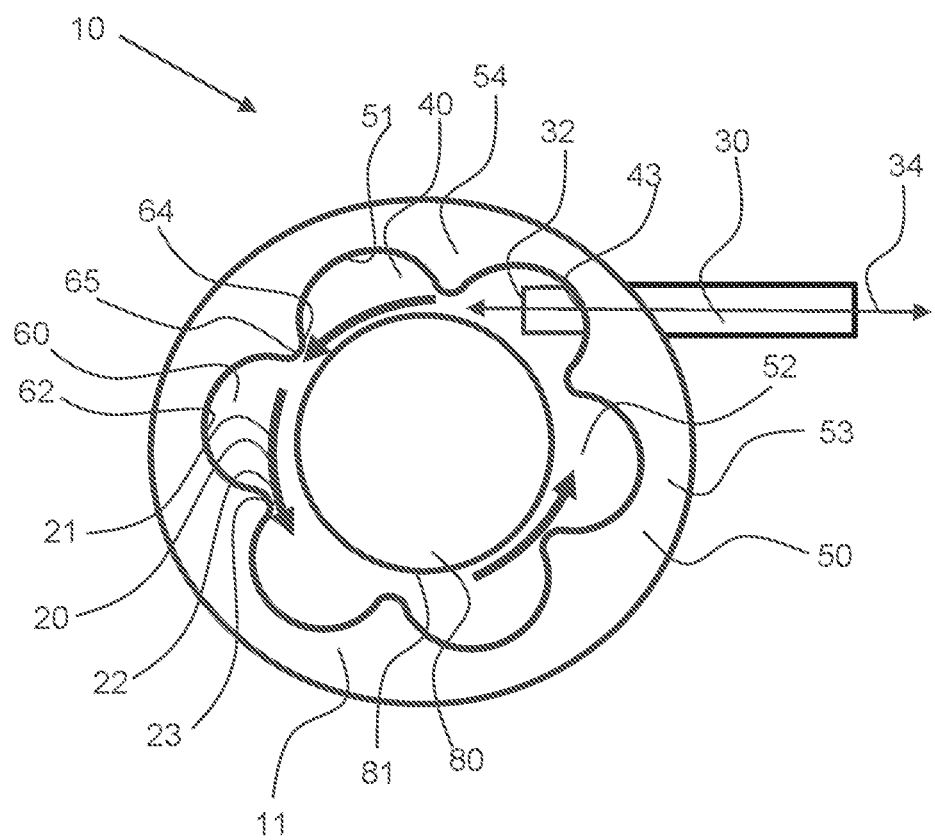
FIG. 6 shows an inlet end of a shroud with the spindle configured therein and a streaming mixture flowing through the separation chamber wherein the liquid portion is condensed out from the aerosol.

Referring now to the Figures, a gas-liquid separator system 10 utilizes a gas-liquid separate assembly 11 to quickly and effectively separate analyte 24 from a streaming mixture 20 or aerosol 21 having a gas portion 22 and a liquid portion such as an analyte 24. As shown in FIG. 2, the streaming mixture 20 flows from the dispense end 32 of the supply tube 30 tangentially around inner surface 51 of the shroud wall 53. The inner surface of the shroud 50 has concave channels 60 formed by concave channel surfaces 62 and channel connectors 64 configured between the concave channel surfaces. This geometry causes the liquid portion or analyte to more readily condense on the inner surface 51 of the shroud wall 53. The tangential and flow of the streaming mixture 20 spirals along inner surface of the shroud wall and around the outer surface 81 of the spindle shaft 80 as shown in FIG. 6. The condensed analyte 24 flows down the concave channels, out of the exhaust ports 69 and onto the spherical collection portion 72. The size of the exhaust ports may be adjusted by adjusting the position of the spherical collection portion with respect to the outlet end 56 of the shroud. The spindle shaft may have threads that thread into thread in the shroud cap for the purpose of adjusting the exhaust port size. As shown in FIG. 5, the condensed liquid analyte 24 flows over the spherical collection 72 and then down over the cone portion 74 to the cone tip where it drips off into a collection container (not shown).

As shown in FIG. 1, a gas-liquid separator system 10 utilizes a gas-liquid separator assembly 11 that includes a shroud 50 that receives an aerosol through a supply tube 30 and a spindle assembly 70 having a spindle shaft 80 (shown in dashed lined) extending up into the shroud cavity. The spindle assembly has a spherical collection portion 72 configured on an outlet end 56 of the shroud and a cone portion 74 coupled to the spherical collection portion and extending to a cone tip 77. The analyte of a streaming mixture condenses on the inner surface of the shroud wall within the shroud cavity and flow down along the concave channels, out of the exhaust ports 69, onto the spherical collection portion 72, over the spherical collection portion and down over the cone portion to the cone tip 77, wherein it drips into a collection container (not shown). The spherical collection portion 72 is spherical in shape as described herein and has a centerline 73 extending through the largest diameter portion of the spherical collection portion. As shown, the spherical collection portion has a larger diameter than the diameter of the spindle shaft. A vertical axis 15 and analyte flow axis 17 are shown aligned with the length of the shroud. The gas-liquid separator assembly 11 is configured for use with the shroud length 55 aligned with the vertical axis 15 to allow gravity to cause the condensed analyte to flow down along the inner surface of the shroud cavity.

Referring to FIG. 2, the shroud 50 and shroud cavity 52 form a separation chamber 40 for an aerosol 21 with concave channels 60 extending down to the outlet end 56 of the shroud. The dispend end 32 of the supply tube 30 is configured to dispense the aerosol tangentially along the inner surface 51 of the shroud wall 53. The concave channel surface 62 causes the liquid portion 23 of the streaming mixture 20 to condense due to changes in pressure caused by the undulating and wavy surface. As shown, the radius of curvature of the concave channels 60 is much greater than the radius of curvature of the channel connectors 64 having a convex connector surface 65. Also, the supply tube 30 extends through a supply tube aperture 43 in the shroud wall 53 and is configured more proximal to the inlet end 54 of the shroud than the outlet end 56. Also, the concave channels extend from the inlet 54 to the outlet end.

Figure 3:
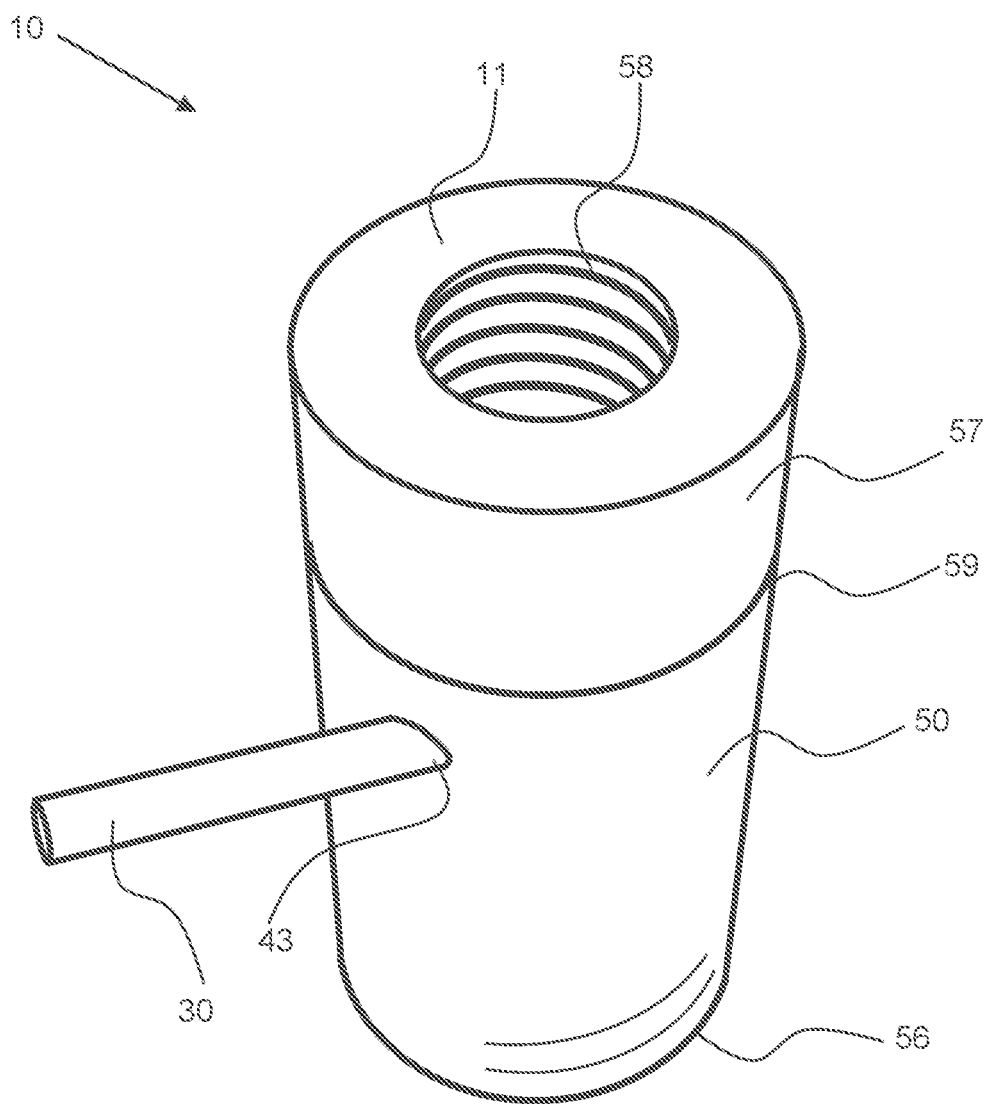
FIG. 3 shows a perspective view of the shroud having a shroud cap with threads for coupling with threads on an extended end of the spindle shaft.

As shown in FIG. 3, the shroud 50 has a shroud cap 57 with threads 58 for coupling with threads on an extended end of the spindle shaft (not shown). As described herein, the exhaust port size or distance of the spherical collection portion can be adjusted by screwing in, or screwing out the spindle assembly from the shroud cap. The shroud cap and shroud have a shroud-cap interface 59 that may be sealed to prevent streaming mixture from escaping therefrom.

Figure 4:
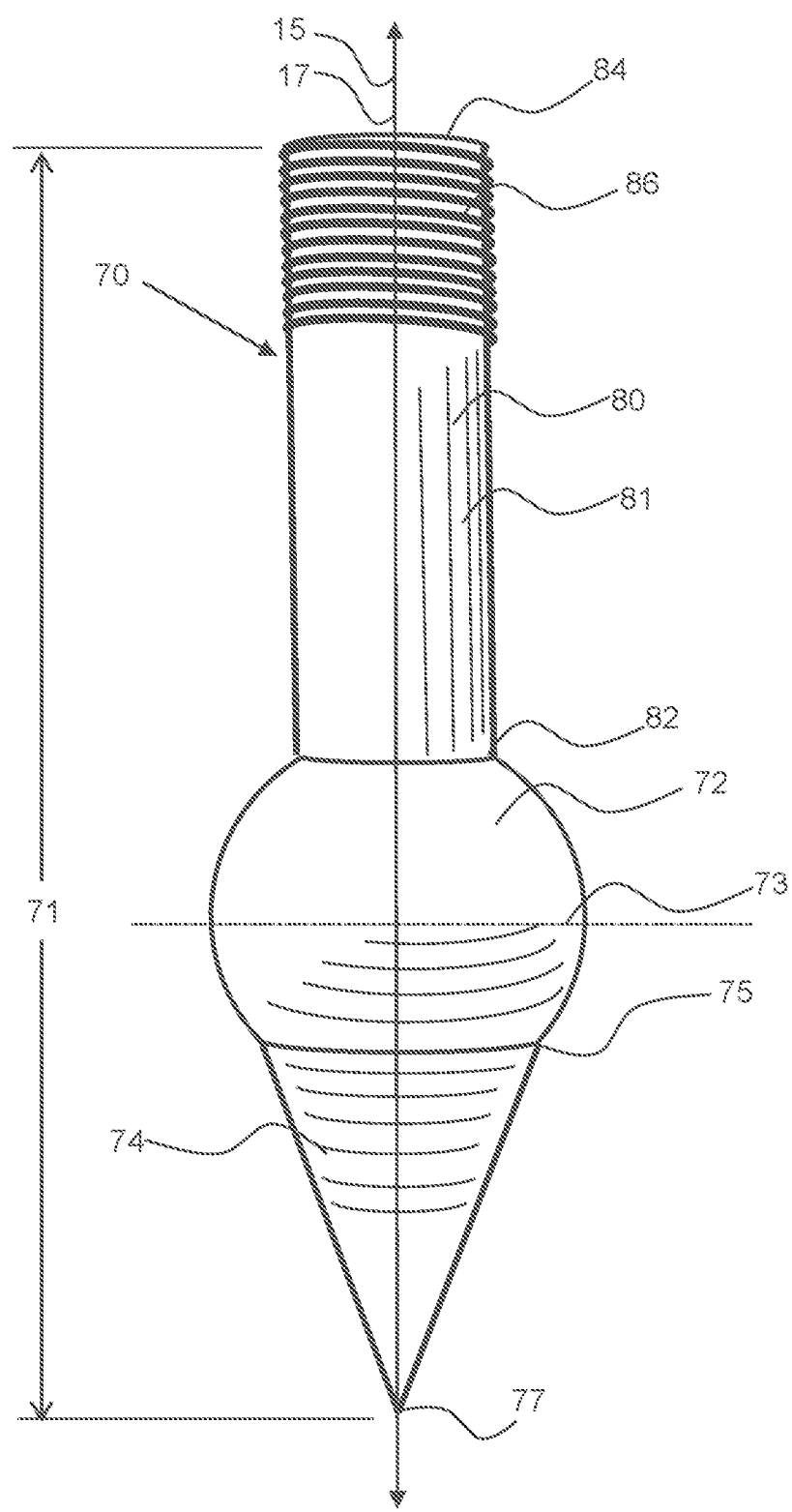
FIG. 4 shows a side view of a spindle assembly having a spherical collection portion, a spindle shaft extending up from the spherical collection portion to an extended end having threads thereon, and a cone portion coupled to and extend in an opposing direction from the spindle shaft to a cone tip.

As shown in FIG. 4, a spindle assembly 70 has a spherical collection portion 72, a spindle shaft 80 extending up from the spherical collection portion to an extended end 84 having shaft threads 86 thereon, and a cone portion 74 coupled to and extending in an opposing direction from the spindle shaft to a cone tip 77. The spindle shaft 80 is coupled to the spherical collection portion 72 along the shaft-collection interface 82. The spherical collection portion 72 has a diameter centerline 73 extending horizontally through the largest diameter portion of the spherical collection portion when it is configured vertically with the length 71 of the spindle assembly 70 aligned along a vertical axis 15.

As shown in FIG. 5, the outlet end 56 of the shroud 50 forms exhaust ports 69 with the spherical collection portion 72 and the spindle shaft 80. The spindle shaft 80 extends up into the shroud cavity 52. The liquid portion 23 is condensed liquid such as an analyte 24 and flows down from the exhaust ports 69 onto the spherical collection portion 72, down over the spherical collection portion and over the collection-cone interface 75 and onto the cone portion 74. The condensed liquid flows down along the cone shaped cone portion to the cone tip where it drips from the cone tip into a collection container (not shown).

As shown in FIG. 6, the gas-liquid separator system 10 is configured with the spindle 80 configured within the shroud 50 to produce a separation chamber 40. A streaming mixture 20 is flowing out of the dispense end 32 of the supply tube 30 and is spiraling around the spindle. The length axis 34 of the supply tube and the direction and location of the dispense end are configured to direct the streaming mixture tangentially along the inner surface 51 of the shroud 50. The undulating inner surface of the shroud creates fluctuations in pressure that aid in causing the liquid portion 23 or analyte 24 to condense on the inner surface of the shroud. As shown the shroud has six concave channels 60 with channel connectors 64 therebetween. The channel connectors 64 may have a convex shape, or convex connector surface 65 with respect to the outer surface of the spindle 80 or to the separation chamber 40. The concave channel surface may have a radius of curvature that is greater than the radius of curvature of the channel connectors, such as about two times or more, about four times or more, about ten times or more, about 20 times or more and any range between and including the values provided. The concave channel surfaces may extend a radius or curvature or about 120 degrees or more, about 160 degrees or more, about 180 degrees or more, about 220 degrees or less, about 270 degrees or less and any range between and including the values provided. The liquid portion may condense along the inner surface 51 of the shroud and flow down along the concave channels 60 and out of the exhaust ports and onto the spherical collection portion.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A gas-liquid separator system comprising a gas-liquid separator comprising:
   a) a shroud forming a shroud cavity, said shroud comprising:
      i) an inlet end;
      ii) an outlet end;
      iii) a length from said inlet end to said outlet end;
      iv) a shroud wall comprising:
         an inner surface configured around said shroud cavity;
         four concave channels extending along the inner surface of the inner wall and along a flow axis to the outlet end; and
         channel connectors configured between the concave channels;
      v) a supply tube aperture extending through the shroud wall and configured proximal to the inlet end;
         wherein said four concave channels extend from the supply tube aperture to the outlet end along said flow axis;
   b) a supply tube extending through the supply tube aperture and having a dispense end configured within the shroud cavity;
      wherein the supply tube has a length axis and wherein the length axis is tangential to the inner surface of the shroud wall;
   c) a shroud cap configured to extend over the inlet end of the shroud and having shroud cap threads; and
   d) a spindle assembly comprising:
      i) a spherical collection portion configured on the outlet end of the shroud;
      ii) a spindle shaft coupled to the spherical collection portion and extending into the shroud cavity from the outlet end past the supply tube aperture and forming a separation chamber between the spindle shaft and the inner surface of said shroud;
   wherein said separation chamber varies in a normal distance from the spindle shaft to the inner surface of the shroud around the circumference of the spindle shaft due to the four concave channels extending along the inner surface of the inner wall;
      iii) a cone portion coupled to the spherical collection portion and configured on an opposing side of the spherical collection portion from the spindle shaft, said cone portion extends in a conical shape from the spherical collection portion to a cone tip;
   wherein exhaust ports are configured between the spherical collection portion and the concave channels on the outlet end of the shroud; and
   wherein a gas-liquid mixture having a gas portion and a liquid portion comprising an analyte is configured to flow through the supply tube and around the spindle shaft within the separation chamber;
   wherein said analyte within the gas-liquid mixture is configured to collect on the inner surface of the shroud and flow along the concave channels, through the exhaust ports, along the spherical collection portion, along the cone portion and off the cone tip for collection and wherein the gas portion is configured to flow through the separation chamber and out of the exhaust ports.

2. The gas-liquid separator system of claim 1, wherein the channel connectors have a convex shape.

3. The gas-liquid separator system of claim 2, wherein the concave channels have a radius of curvature that is at least twice that of a radius of curvature of the channel connectors.

4. The gas-liquid separator system of claim 2, wherein the concave channels have a radius of curvature that is at least five times that of a radius of curvature of the channel connectors.

5. The gas-liquid separator system of claim 1, wherein the spindle shaft extends from the spherical collection portion to an extended end that is coupled with the shroud cap.

6. The gas-liquid separator system of claim 5, wherein the spindle shaft has threads on the extended end configured to thread into threads of the shroud cap.

7. The gas-liquid separator system of claim 6, wherein turning the spindle assembly to thread the threads of the spindle shaft into the threads of the shroud cap reduces the size of the exhaust ports.

8. The gas-liquid separator system of claim 6, wherein turning the spindle assembly to un-thread the threads of the spindle shaft from the threads of the shroud cap increases the size of the exhaust ports.

9. The gas-liquid separator system of claim 1, wherein the shroud has a length from inlet end to the outlet end and wherein the concave channels extend from the inlet end to the outlet end.

10. The gas-liquid separator system of claim 1, wherein the shroud has a length from inlet end to the outlet end and wherein the supply tube aperture is configured within 20% of said length from the inlet end.

11. The gas-liquid separator system of claim 1, wherein the dispense end of the supply tube is configured to dispense the aerosol tangentially along the inner surface of the shroud wall.

12. The gas-liquid separator system of claim 1, wherein the spindle shaft has a cylindrical shape with a circular cross section along a length of the spindle.

13. The gas-liquid separator system of claim 12, wherein the spindle shaft of the spherical collection portion has a diameter that is smaller than a diameter of the spherical collection portion.

14. The gas-liquid separator system of claim 13, wherein the diameter of the spindle shaft is between 35% and 80% of the diameter of the spherical collection portion.

15. A method of gas-liquid separation comprising:

a) providing a gas-liquid separator system as described in claim 1;

b) flowing said gas-liquid mixture through the supply tube, out of the dispense end of said supply tube and into said separation chamber between the spindle shaft and the inner surface of the shroud wall;

c) collecting a liquid portion of the streaming mixture on the inner surface of the shroud to form a collected liquid portion; and d) flowing the collected liquid portion along the concave channels, through the exhaust ports, over the spherical collection portion, along the cone portion and off the cone tip for collection.

16. The method of claim 15, wherein the spindle shaft has a cylindrical shape with a circular cross section along a length of the spindle.

17. The method of claim 15, wherein the concave channels have a radius of curvature that is at least twice that of a radius of curvature of the channel connectors.

18. The method of claim 15, wherein the concave channels have a radius of curvature that is at least five times that of a radius of curvature of the channel connectors.

19. The method of claim 15, wherein the spindle shaft extends from the spherical collection portion to an extended end that is coupled with the shroud cap.

* * * * *